(12) United States Patent  (10) Patent No.: US 8,952,979 B2
Cameron  (45) Date of Patent: Feb. 10, 2015

(54) WAVE FILL

(71) Applicant: Autodesk, Inc., San Rafael, CA (US)

(72) Inventor: Josh Cameron, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 318 days.

(21) Appl. No.: 13/622,938

(22) Filed: Sep. 19, 2012

(65) Prior Publication Data

US 2014/0078142 A1 Mar. 20, 2014

(51) Int. Cl.
*G09G 5/02* (2006.01)
*G06K 9/48* (2006.01)

(52) U.S. Cl.
USPC .......................................... 345/589; 382/199

(58) Field of Classification Search
None
See application file for complete search history.

(56) References Cited

U.S. PATENT DOCUMENTS

| 7,110,003 | B2* | 9/2006 | Doan .............................. 345/611 |
| 2004/0135792 | A1* | 7/2004 | Yanovski et al. .............. 345/589 |
| 2007/0223808 | A1* | 9/2007 | Kerr ............................... 382/159 |
| 2009/0122072 | A1* | 5/2009 | Ameline et al. ............... 345/589 |
| 2011/0141301 | A1* | 6/2011 | Raghoebardajal et al. 348/222.1 |

* cited by examiner

*Primary Examiner* — Carlos Perromat
*Assistant Examiner* — Nurun N Flora
(74) *Attorney, Agent, or Firm* — Gates & Cooper LLP

(57) ABSTRACT

A method, system, apparatus, article of manufacture, and computer readable storage medium provide the ability to fill pixels of an image. An area of the image is obtained and one of the pixels is identified as an anchor pixel. Waves are created based on the anchor pixel and placed into a collection of waves waiting to be processed. Each of the waves in the collection is processed. A type of pixel in front of a current wave being processed is determined. If the pixel is fillable, the pixel is filled, the wave is advanced, and child waves are updated. If the pixel is blocking the advancement of the wave, the current wave is updated (e.g., via shrinking or splitting), and child waves are updated. Once all waves have been processed, the area of the image is displayed based on the fill.

20 Claims, 12 Drawing Sheets

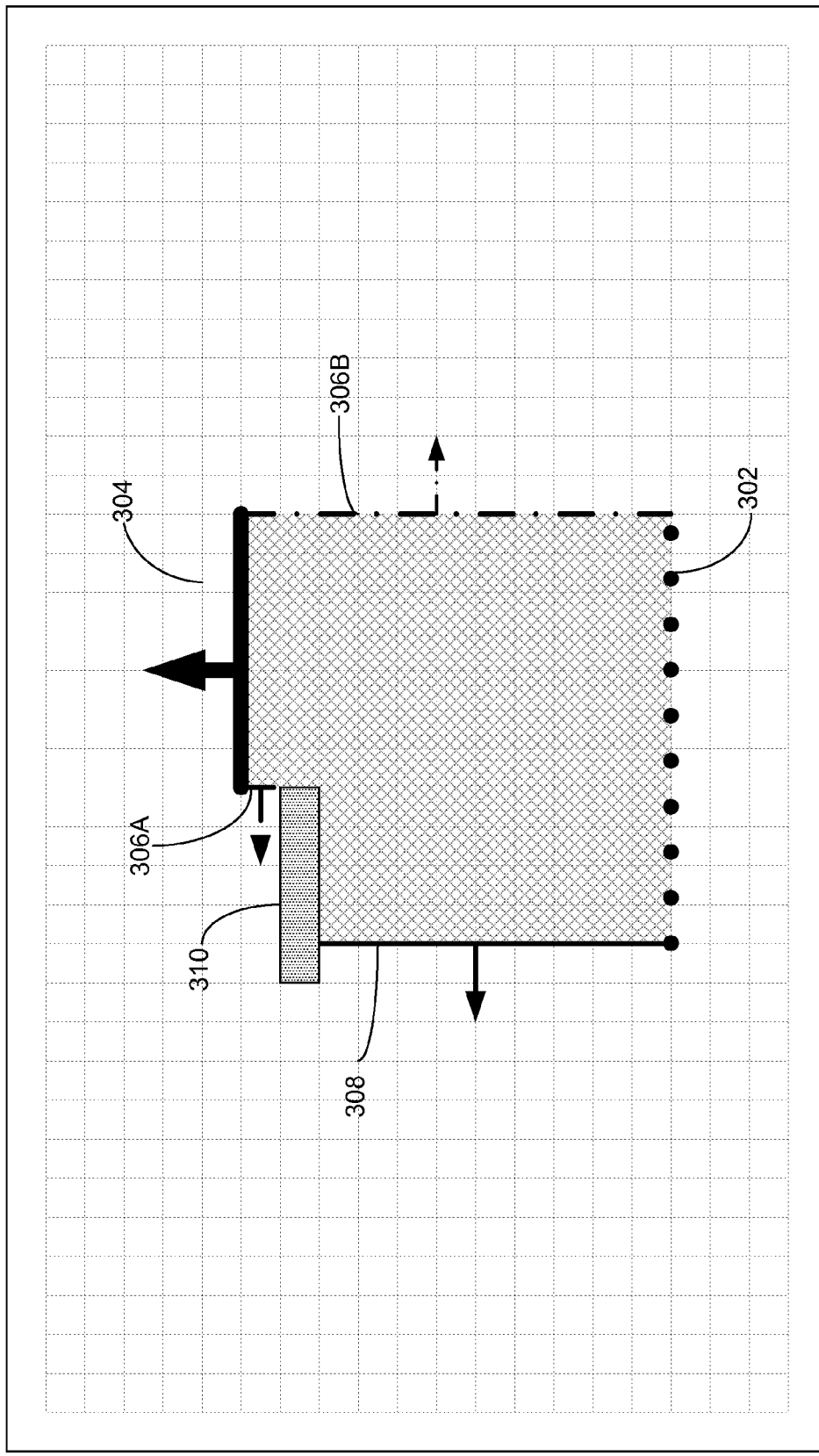

WAVE FILL

BACKGROUND OF THE INVENTION

1. Field of the Invention

The present invention relates generally to image processing, and in particular, to a method, apparatus, and article of manufacture for filling an area of an image.

2. Description of the Related Art

A common thing users of drawing, painting and image processing software do is fill an area of an image with a solid color, color gradient (two or more colors fading into one another), or texture. This operation is usually called "flood fill". Another common thing users do in such software is select an area of more or less uniform color to which they want to limit the effects of subsequent actions. This is usually called "magic wand" selection. In both cases, the user clicks on a pixel in the image (referred to herein as the "anchor pixel"), and a system/methodology is needed to find "fillable" pixels: pixels similar in color to the anchor pixel, and adjacent to either the anchor pixel or to another fillable pixel. There are lots of different ways such a system and methodology can be implemented. The efficiency and complexity of the system and methodology can vary widely. Efficiency is very important, since the system and methodology needs to examine potentially millions of pixels to determine whether they are fillable. Complexity is less critical than efficiency, but still important, since a complex system and methodology is harder for a software development team to understand, maintain, and enhance than a simple one.

Prior art systems for performing flood fill operations often examine the value of each pixel in an image at least four times. In this regard, prior art solutions utilize a collection of pixels to be processed. Having determined a pixel to be fillable, the pixels above, below, to the left, and to the right of the fillable pixel are added to the collection of pixels to be processed. This means it is common for a given pixel of the image to be checked four times.

Accordingly, what is needed is a system and methodology for determining, locating, and filling pixels in an efficient and simple manner.

SUMMARY OF THE INVENTION

This invention solves the problem of identifying fillable pixels efficiently, in a fairly simple and easy to understand way. Embodiments of the invention examine potentially fillable pixels slightly more than once, on average, which is close to optimal. An optimal system, in terms of efficiency, would examine each potentially fillable pixel exactly once.

Embodiments of the invention are also simple enough to describe to a competent software developer in a matter of minutes with the aid of a few sketches. This is in contrast to many other systems/methodologies solving the same problem, which require some study to understand.

Embodiments of the invention analyze pixels based on an analogy of waves traveling through the image. As each wave advances through the image, the pixels in front of the wave are examined to determine if they are border pixels. As the wave advances, it also grows child waves on its left and right ends, like a wake forming behind a boat. Once all waves (including child waves and further descendant waves) have been analyzed, all fillable pixels have been identified and can be filled.

BRIEF DESCRIPTION OF THE DRAWINGS

Referring now to the drawings in which like reference numbers represent corresponding parts throughout:

FIGS. 5A-5C show how a wave shrinks when it encounters border (or filled) pixels on its left end in accordance with one or more embodiments of the invention;

DETAILED DESCRIPTION OF THE PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Hardware Environment

Figure 1:
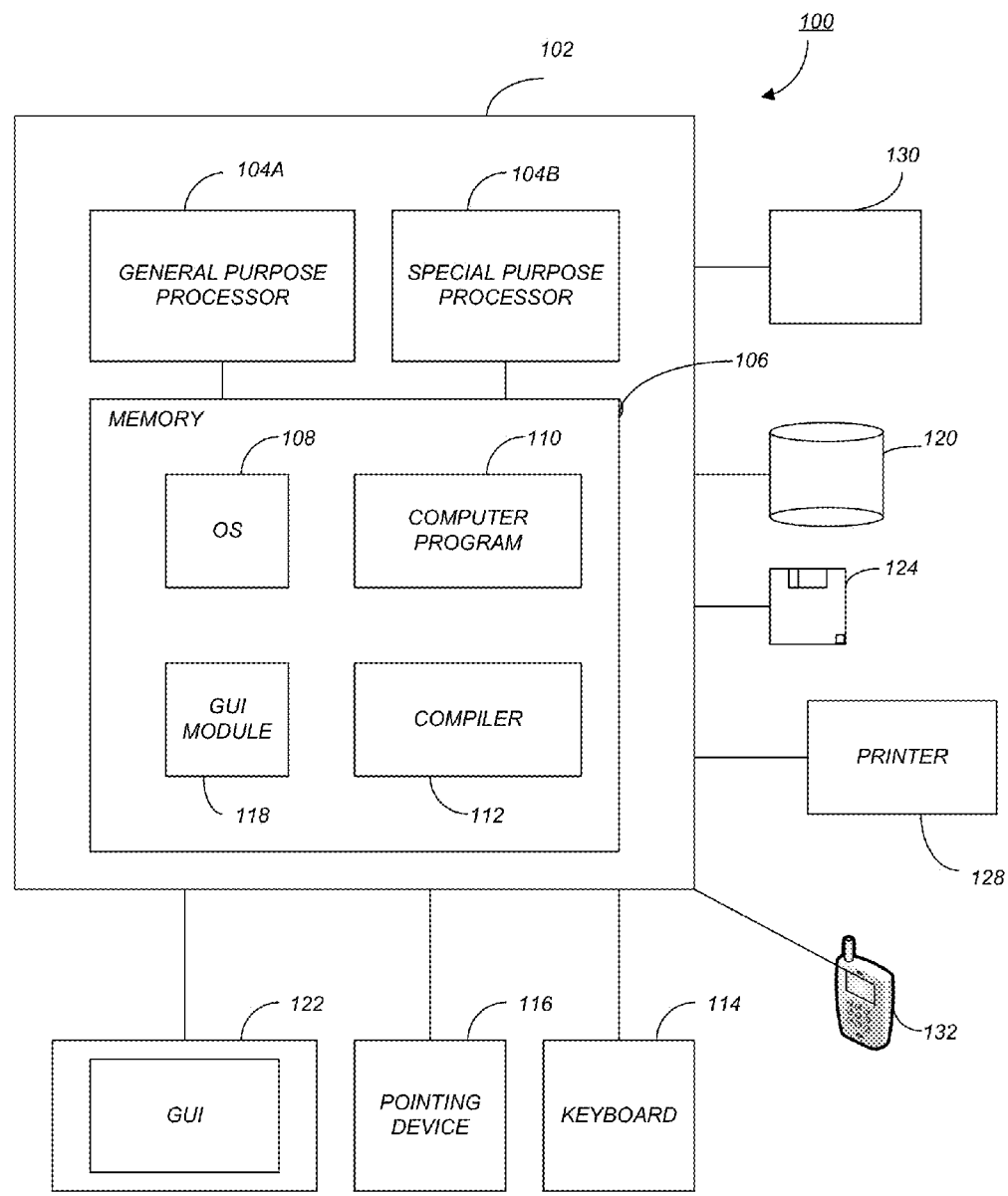
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 that allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
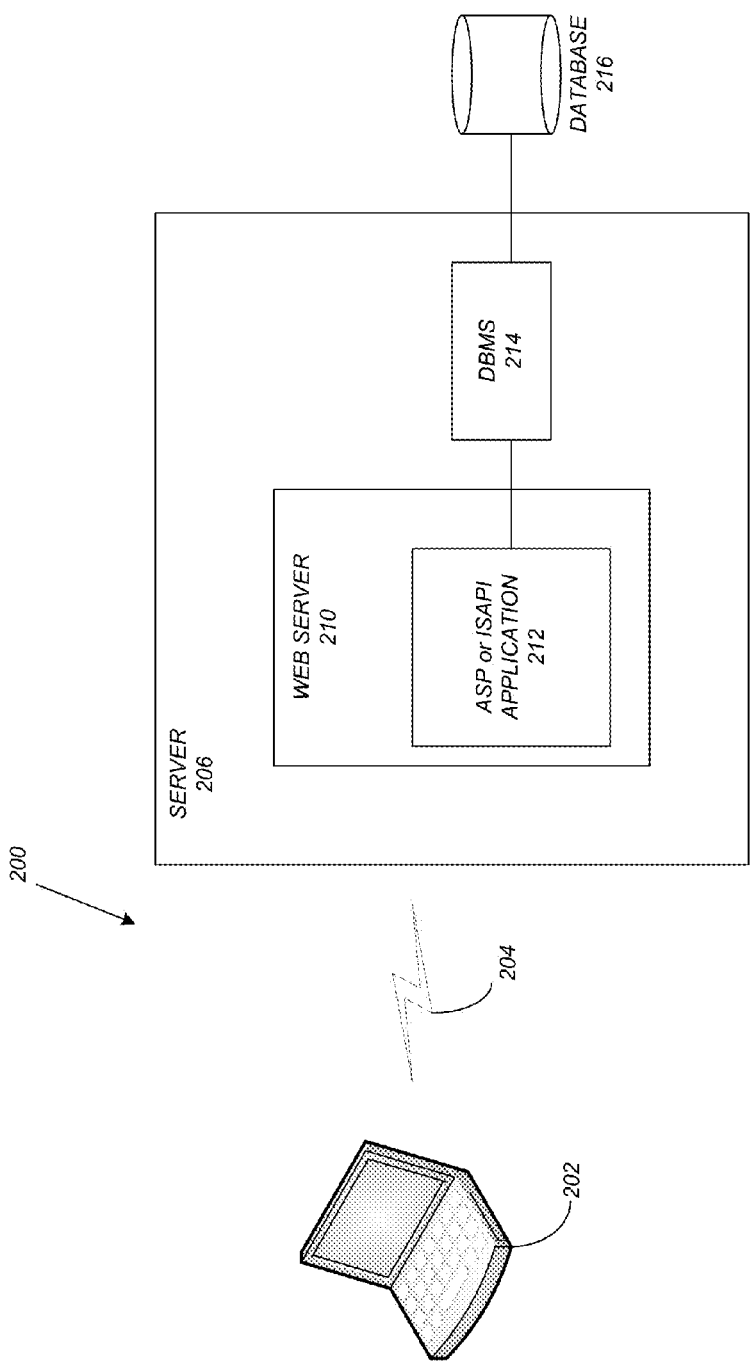
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment Overview

Embodiments of the invention are implemented as a software application on a client 202 or server computer 206. Further, as described above, the client 202 or server computer 206 may comprise a thin client device or a portable device that has a multi-touch-based display.

Definitions

Anchor pixel: The pixel clicked on by the user as a starting point for a fill or magic wand operation.

Color distance: A measure of the difference between two colors. Two very similar colors would have a small color distance, while two very different colors would have a large color distance. System/methodologies of the invention may only refer to the color distance between the color of the anchor pixel and the color of a pixel that is being considered for filling. As used herein, the color distance of a pixel refers to the color distance of that pixel with respect to the anchor pixel. The color distance can be determined based on any known computation including Euclidean distance (in a device independent color space such as RGB [red, green, blue], CMYK [cyan, magenta, yellow, and key], YUV [luma-Y, and two chrominance components—UV], LCh [lightness, chroma, and hue], HSL [hue, saturation, and lightness], HSV [hue, saturation, and value], HIS [hue, saturation, and intensity], etc.).

While embodiments of the invention refer to color distance, system/methodologies of the invention may apply to any data structure of values arranged in a manner that may be thought of as a two dimensional (2D) grid, wherein each value may be compared, using some comparison function, against a reference value to determine if the difference between those values exceeds some tolerance or threshold. The values do not necessarily need to be colors, although this is a common problem domain to which the methodology applies. The values do not need to be arranged spatially in a 2D manner, they merely need to be arranged in a manner that can readily be thought of as such.

Tolerance: A value—usually specified directly or indirectly by the user—used to determine whether a pixel is considered a border pixel.

Border pixel: A pixel whose color distance exceeds the tolerance. The fill does not pass through border pixels.

Fillable pixel: A pixel whose color distance does not exceed the tolerance.

Fill region: The anchor pixel and all pixels directly or indirectly adjacent to the anchor pixel whose color distances do not exceed the tolerance. Embodiments of the invention grow the fill region, starting from the anchor pixel, until the fill region is bounded on all sides by border pixels and/or the sides of the image itself.

System/Methodology

Systems and methodologies of embodiments of the invention are built around the analogy of waves traveling through the image. As each wave advances through the image, the pixels in front of the wave are examined to determine if they are border pixels. As the wave advances, it also grows child waves on its left and right ends, like a wake forming behind a boat.

Figure 3:
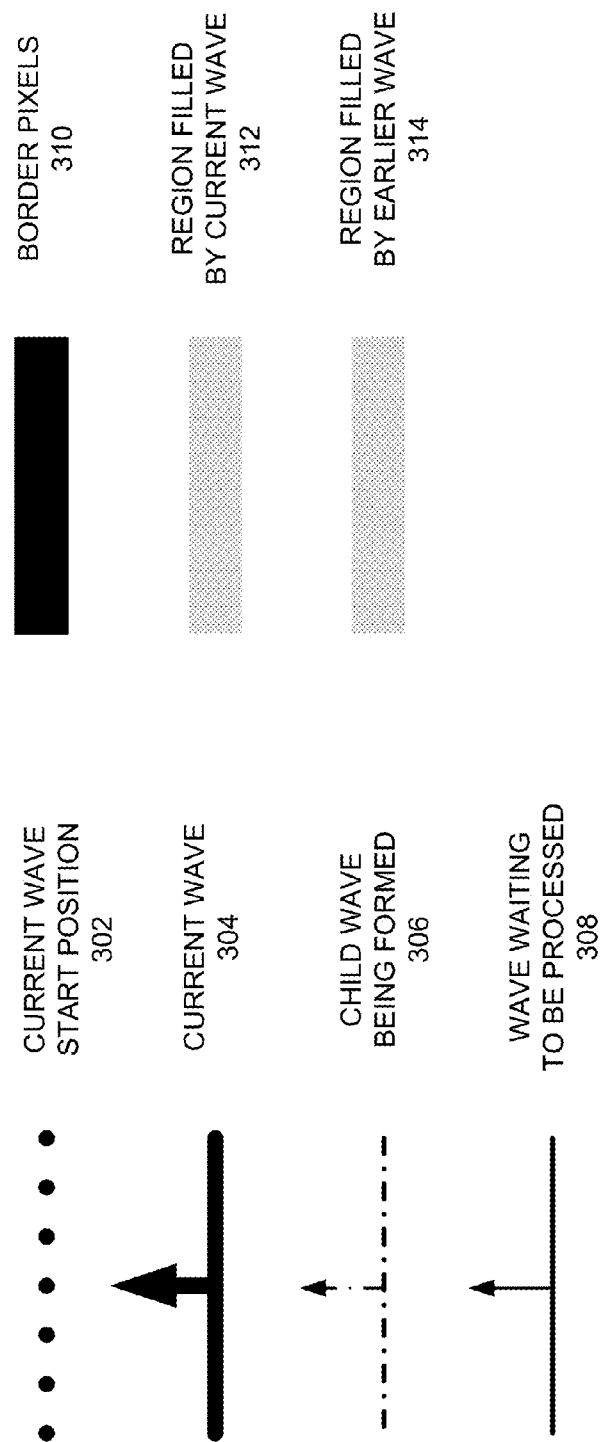
FIG. 3 illustrates a visual representation of the various entities used to determine the fillable pixels in accordance with one or more embodiments of the invention.

FIG. 3 illustrates a visual representation of the various entities used to determine the fillable pixels in accordance with one or more embodiments of the invention. The start position 302 of the current wave 304 is represented by a dotted line. The current wave 304 is represented by a thick solid line. A child wave being formed 306 is represented by a dashed/dotted line. The wave waiting to be processed 308 is represented by a thin solid line. The border pixels 310 are represented by black shading. The region 312 filled by the current wave 304 is represented by a hatch fill pattern. The region 314 filled by an earlier wave is represented by a diagonal fill pattern.

Figure 4:
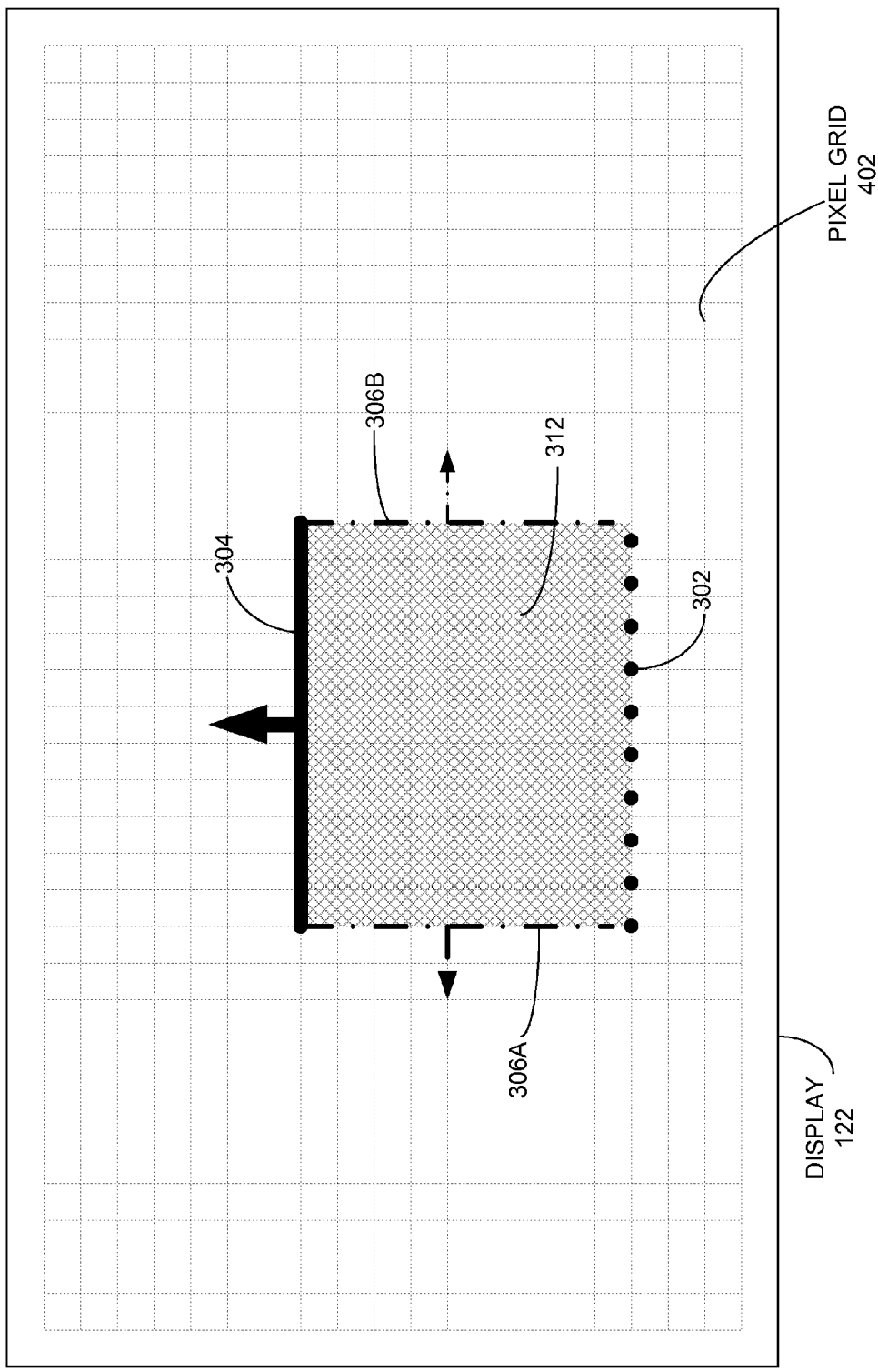
FIG. 4 illustrates how a current wave and its child waves are arranged relative to one another and to a filled region in accordance with one or more embodiments of the invention.

FIG. 4 illustrates how the current wave 304 and its child waves 306 (e.g., left child wave 306A and right child wave 306B) are arranged relative to one another and to the filled region 312. Each wave 304-306 exists between two rows or columns of pixels (i.e., as illustrated by pixel grid 402). Pixels behind the wave 304 have already been filled (as indicated by fill region 312).

Embodiments of the invention process one wave 304 at a time (except when multi-threaded, in which case each CPU core (e.g., processors 104A and/or 104B) may process one wave 304 at a time, provided each core is filling a portion of the image that does not overlap portions being filled by other cores). This wave (i.e., the wave being processed) is called the current wave 304. Waves 306-308 are not yet entered into the collection of waves to be processed. Instead, waves 306-308 remain attached to wave 304 until the left end (for 306A) and/or right end (for 306B) of wave 304 can no longer advance, at which point such waves 306A and/or 306B are released from parent wave 304 and are entered into the collection of waves waiting to be processed.

Processing the current wave 304 means advancing the wave 304 through pixels 402 of the image until no part of the wave 304 can advance any further. To advance a wave 304—and hence expand the fill region 302—the row or column of pixels 402 in front of the wave 304 are examined to determine if the wave 304 can proceed through them. There are three kinds of pixels that might be found in front of a wave 304: previously filled pixels 314, border pixels 310, or fillable pixels. The wave 304 proceeds through fillable pixels, but is blocked by border pixels 310 and by pixels already filled by earlier waves 314.

When a wave 304 encounters a border pixel 310 (an/or a previously filled pixel 314), the wave 304 may shrink on the left end (if the border pixel 310 and/or previously filled pixel 314 blocks the left end), shrink on the right end (if the border pixel 310 and/or previously filled pixel 314 blocks the right end), or split into two waves 304 (if the border pixel 310 and/or previously filled pixel 314 blocks the wave 304 somewhere other than the left or right ends). Any time a wave 304 shrinks, the child wave 306 on the shrinking end is released from its parent 304 and added to the collection of waves 308 waiting to be processed.

Figure 5A:
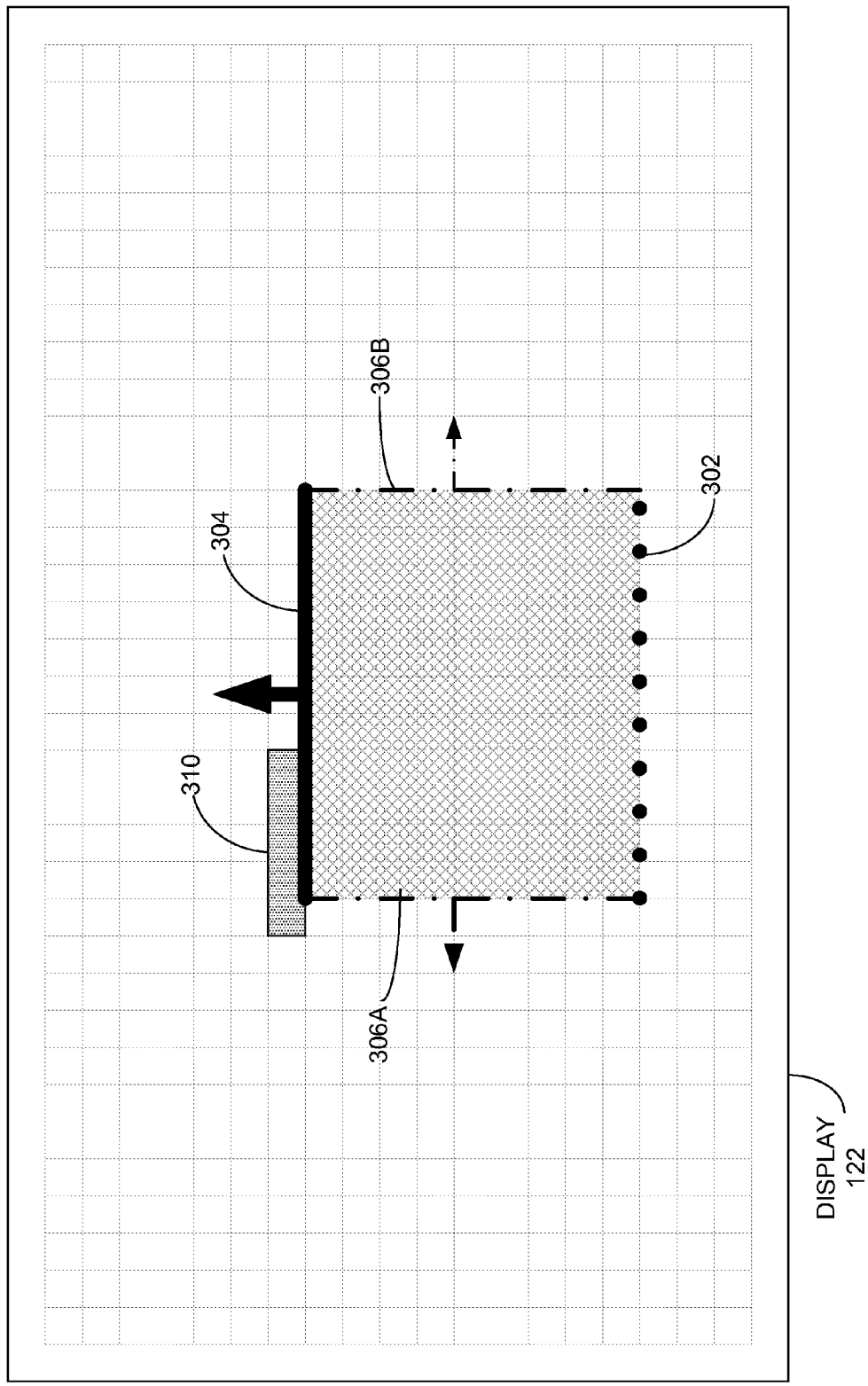
Figure 5B:
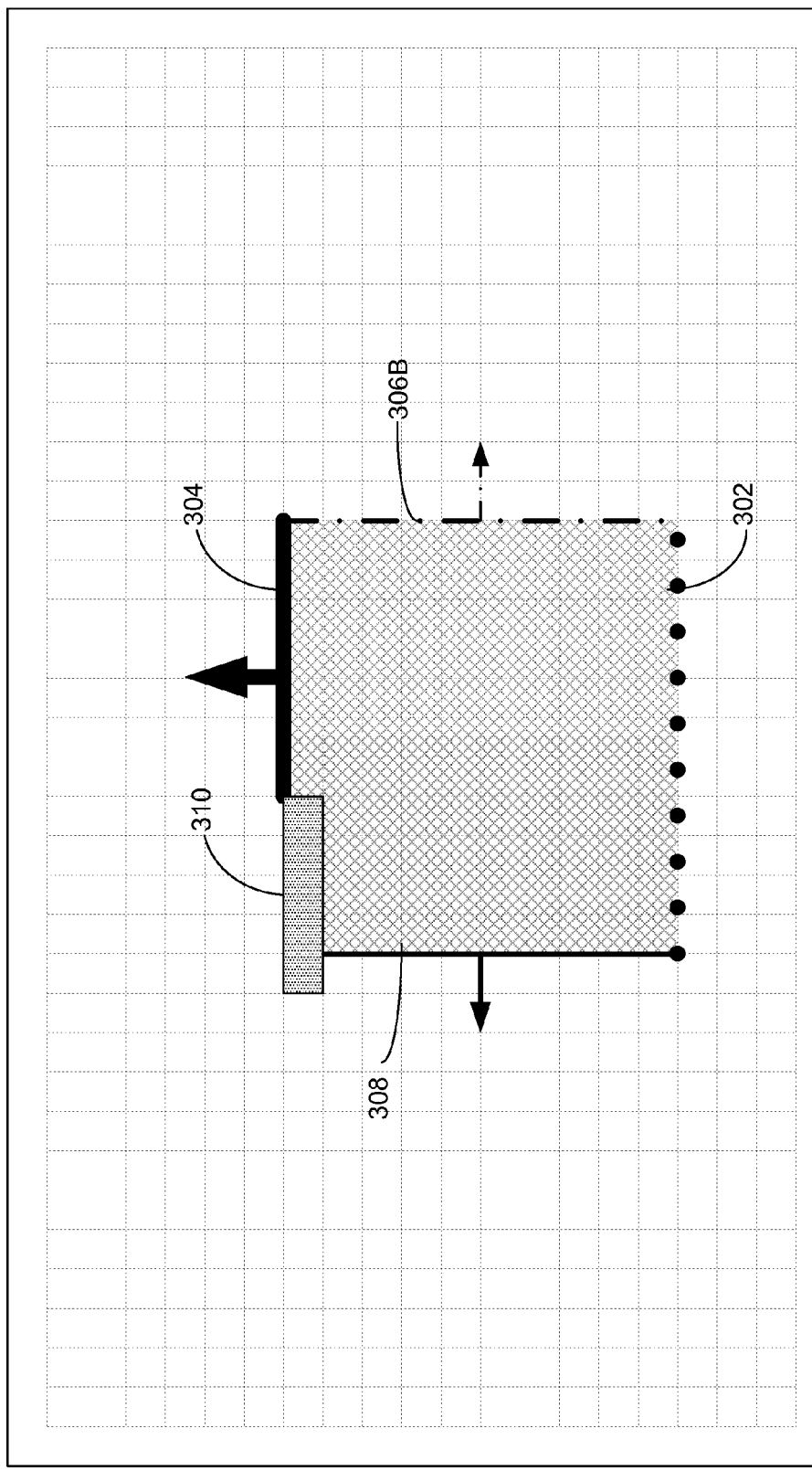

FIGS. 5A-5C show how a wave 304 shrinks when it encounters border 310 (or previously filled 314) pixels on its left end. In step 1 (FIG. 5A), the current wave 304 has advanced so it is now blocked by border pixels 310 on the left end. In step 2 (FIG. 5B), the left end of the current wave 304 has shrunk enough to allow the wave 304 to advance where it isn't blocked by border pixels 310. The left child wave 306A (of FIG. 5A) has been released from the current wave 304 and put in the collection of waves waiting to be processed 308. Note the current wave 304 does not yet have a new left child wave. The lack of a new left child wave results since it is already known that such a new left child wave would be blocked on the left end (those border 310 (or previously filled 314) pixels are what caused the current wave 304 to shrink on the left side in the first place. In step 3 (FIG. 5C), the current wave 304 has advanced another pixel and has started forming a new left child wave 306A.

FIGS. 6A-6D show how a wave splits when it encounters border 310 (or previously filled 314) pixels in its middle. In step 1 (FIG. 6A), the current wave 304 has advanced so it is now blocked by border pixels 310 near (but not on) the left end.

In step 2 (FIG. 6B), the left end of the current wave 304 continues to advance, but the right end 308A has split off and is now in the collection of waves 308 waiting to be processed. The right child wave 309 of the current wave 304 is now the right child wave 309 of the right end wave 308A and has not yet been entered into the collection of waves waiting to be processed.

In step 3 (FIG. 6C), the current wave 304 continues to advance filling pixels 312. As the wave 304 advances, the length of child wave 306A grows. In addition, once the initial border pixel 310 that was blocking the wave has been passed, a new child wave 306B is formed on the right side. Such a formation ensures that all pixels are considered. In this regard, if a region of border pixels blocking a wave contains fillable pixels adjacent to pixels the wave will eventually fill, embodiments of the invention will discover and fill those pixels during subsequent processing of child waves. Alternatively, when forming child waves 306, a determination may be conducted to determine if border pixels 310 would prevent such a wave from forming.

Figure 6A:
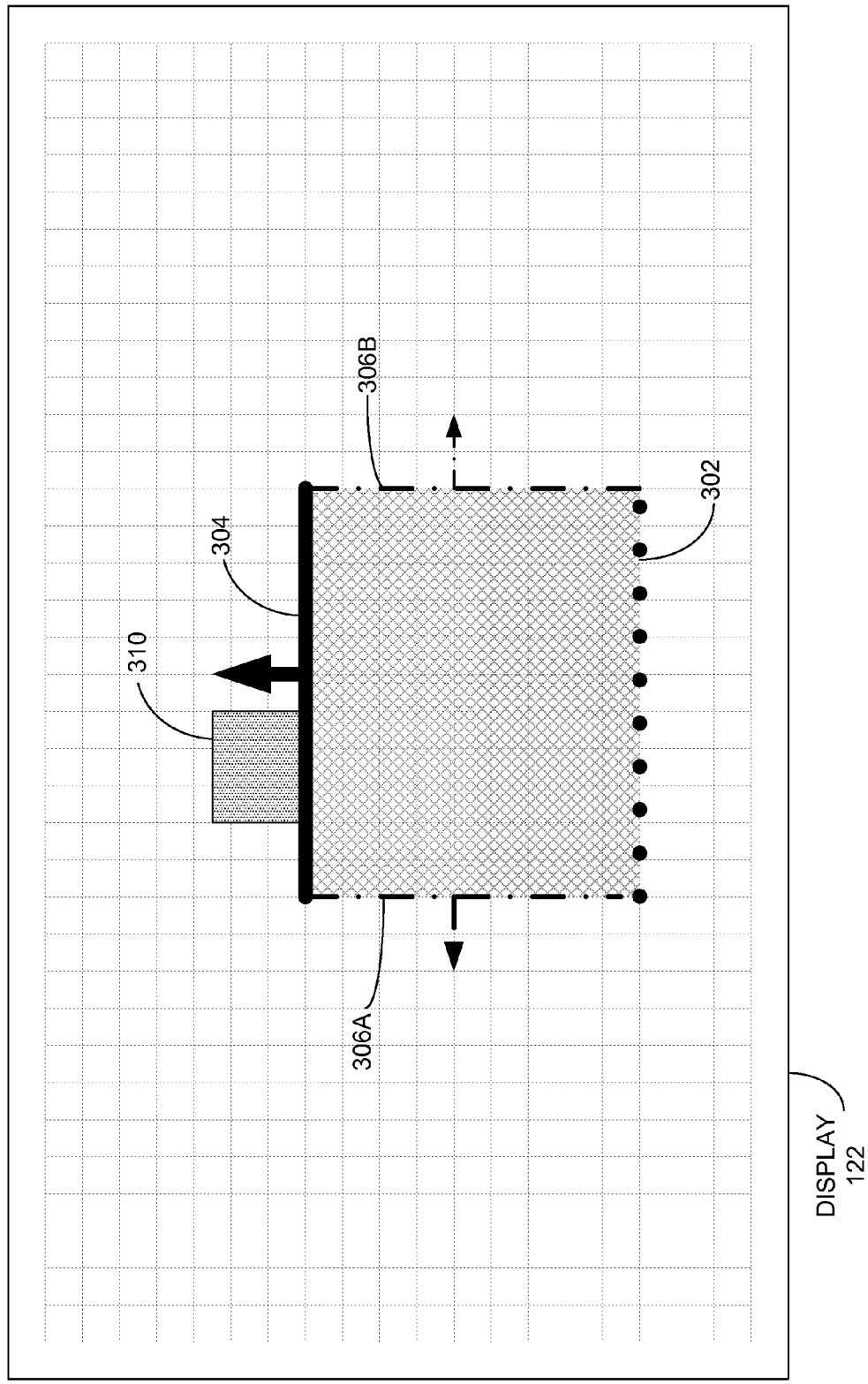
FIGS. 6A-6D show how a wave splits when it encounters border (or filled) pixels in its middle in accordance with one or more embodiments of the invention.
Figure 6B:
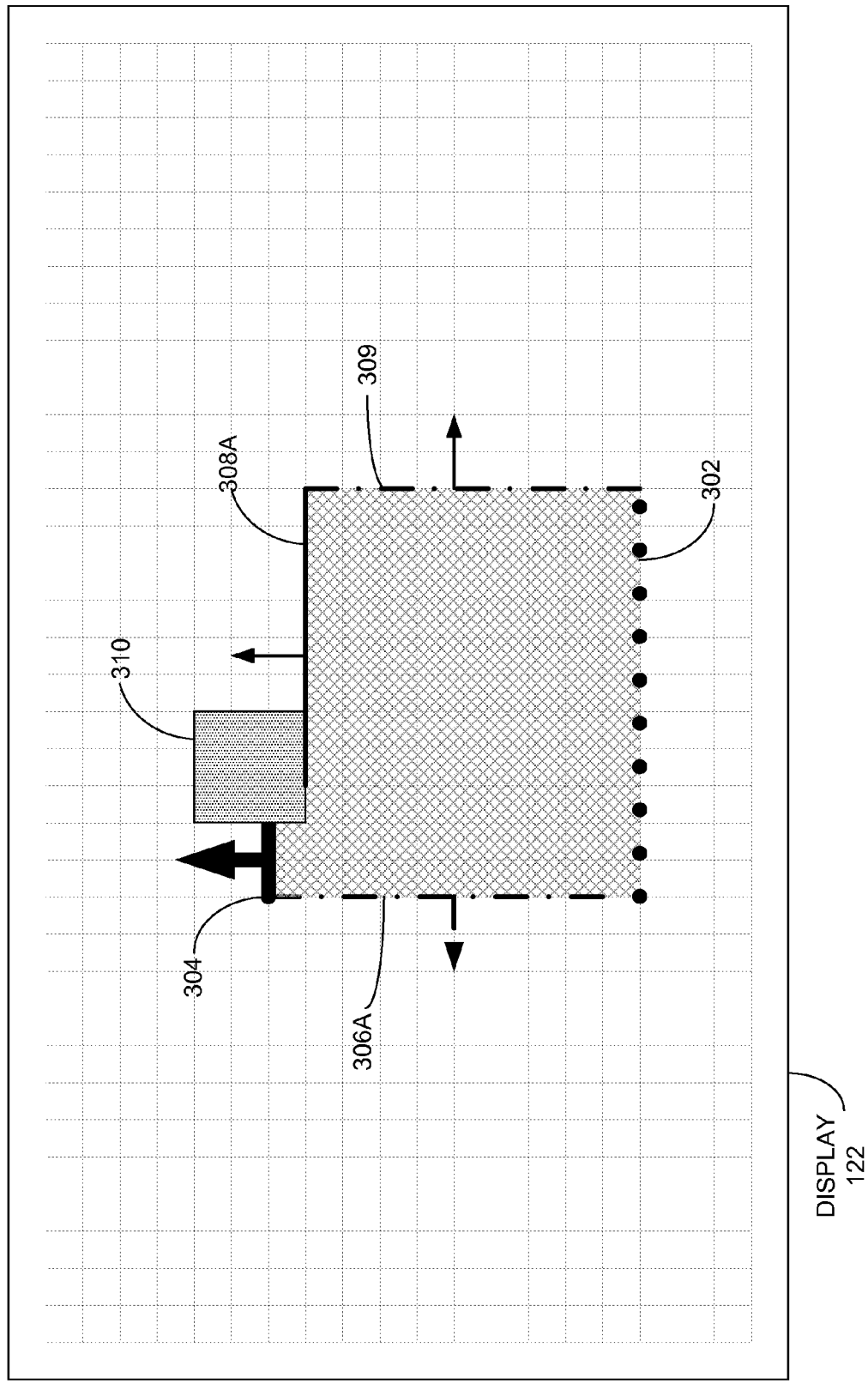
Figure 6C:
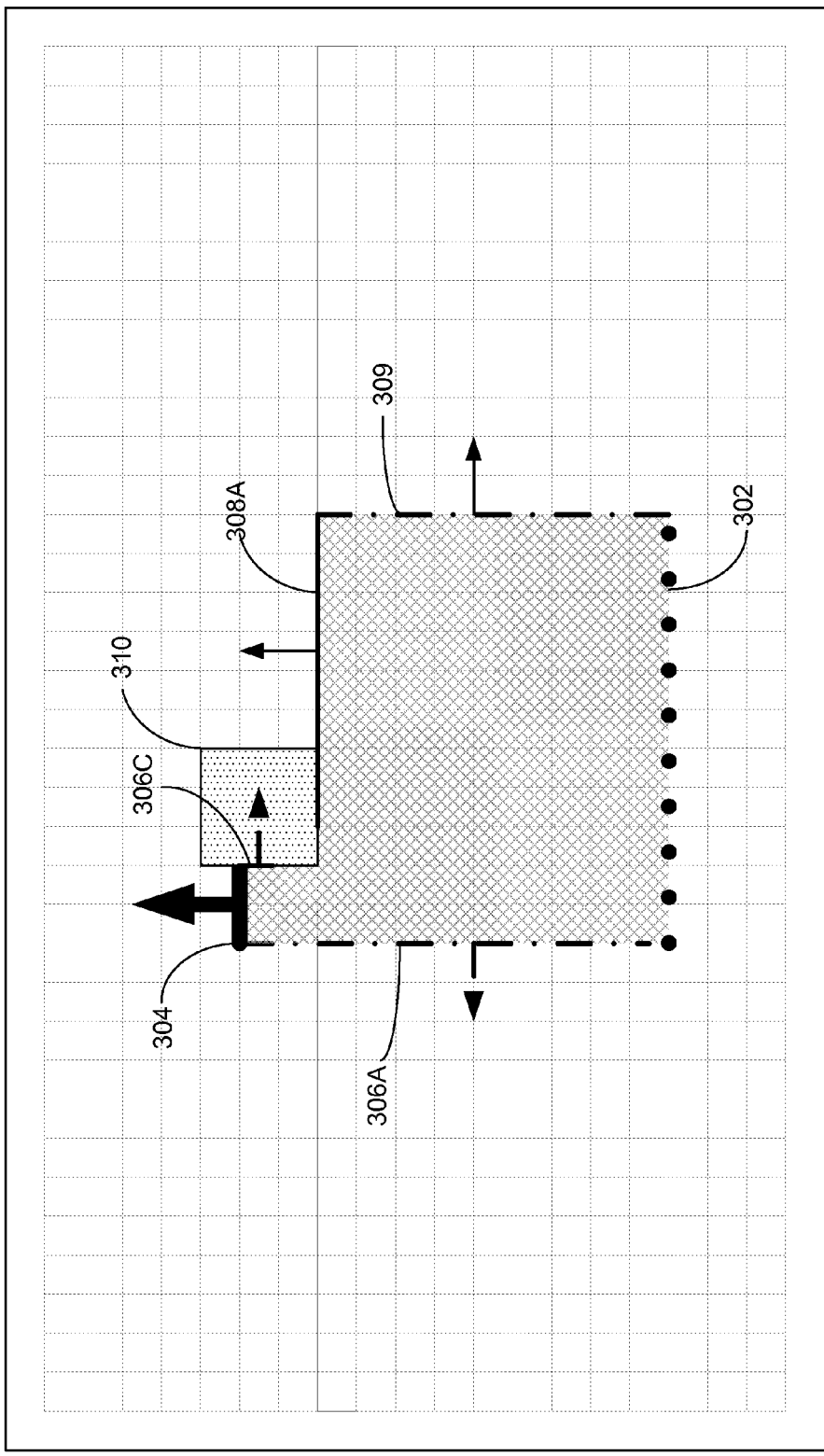
Figure 6D:
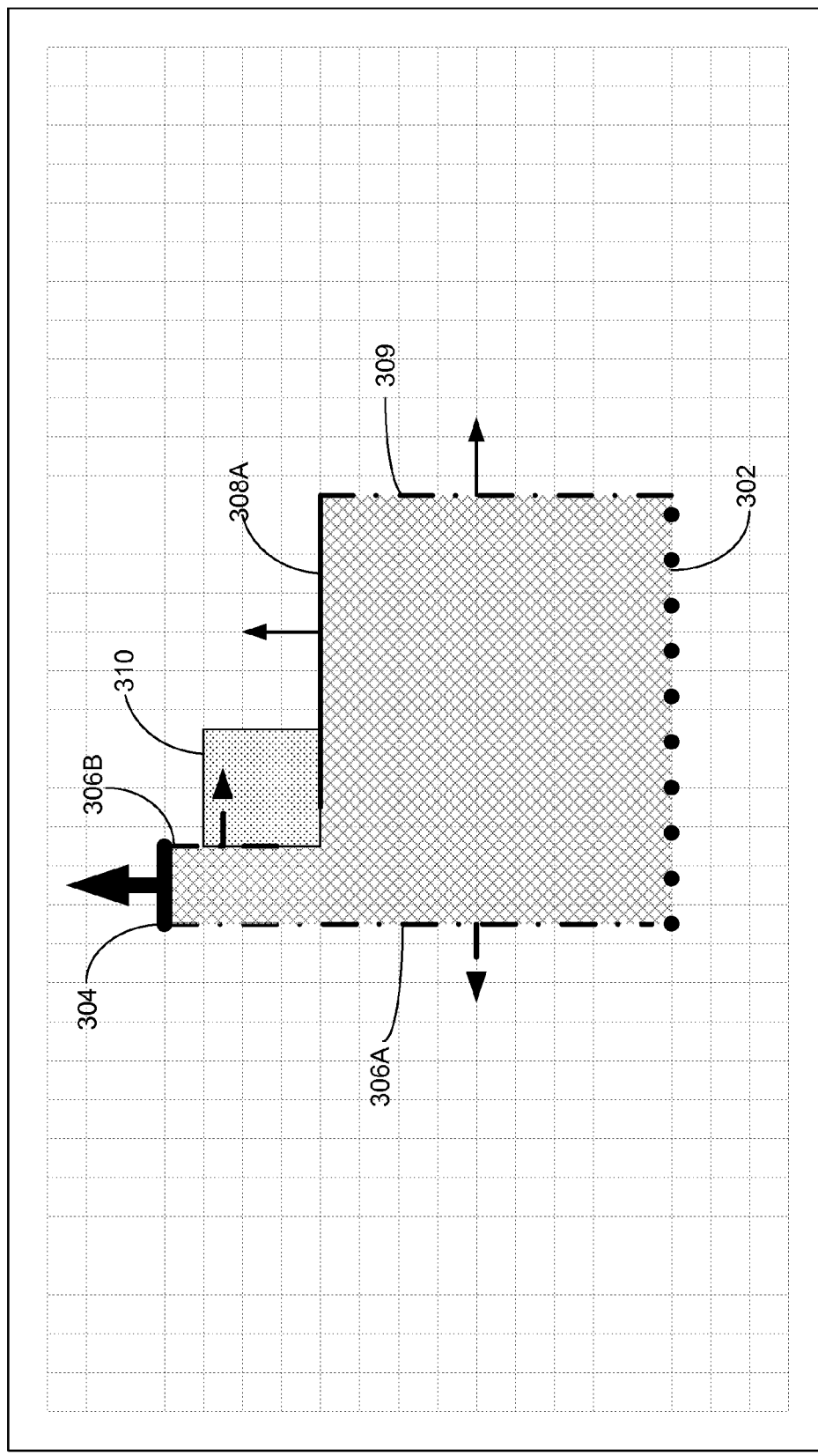

As the wave advances the child waves 306 continue to expand as illustrated in step 4 (FIG. 6D).

Once a wave 304 has reached the end of the image or cannot proceed any further (e.g., is blocked), the wave 304 is marked as being processed, and a new wave from the waves 308 waiting to be processed is selected for processing.

Three-Dimensional Embodiments

One or more embodiments of the invention may be performed in a 3D environment. In this regard, the system/methodology described above, may apply to a voxel (a voxel is a mix of "volume" and "pixel") representation of a 3D space. In other words, the 3D space that is to be flood filled needs to be represented by a 3D array of cubes. Voxels are analogous to pixels in the 2D methodology described herein. Voxels are fairly commonly used to represent 3D space for certain kinds of problems.

Each voxel needs to have a value you can compare against the value of the anchor voxel. This value is analogous to the color values of image pixels and the anchor pixel. Most likely in a 3D flood fill, this value would represent something other than color (e.g., density, temperature, etc.) (depending on the application).

Instead of each wave being thought of as a line segment travelling through 2D space, each wave would lie on a plane travelling through 3D space. From the anchor voxel, six initial waves may be created, heading in the six possible directions in 3D space (e.g., $-X$, $+X$, $-Y$, $+Y$, $-Z$, $+Z$). This may be thought of as making a copy of the six faces of the anchor voxel and sending them outward from the anchor voxel.

As each of the six waves travels through the voxel space, it builds four child waves, pointed in different directions. The initial wave heading in the $+X$ direction would build child waves pointed in the $-Y$, $+Y$, $-Z$ and $+Z$ directions. When the initial $+X$ wave is blocked by a border voxel or previously filled voxel, the four child waves would be released into the collection of waves to be processed.

Representing, splitting, and shrinking the waves may be somewhat different in a 3D environment. For a wave the size of one face of a voxel, the representation, splitting, and shrinking of a wave may be fairly simple. However, typically, a wave may be many voxels wide and many voxels high. If one thinks of a wave as a tablecloth being lowered onto a table, the center of the wave is blocked as the tablecloth strikes the table, but the edges of the wave—the portions not yet touching the table—must break away from the blocked region and continue to travel in the direction the tablecloth was originally travelling.

In view of the above, embodiments of the invention may represent the wave as a rectangle travelling through the voxel field. The rectangle has four edges, each of which usually has a child wave associated with it. The rectangle advances one layer/slice of voxels at a time. To advance the wave, the voxels, that the wave needs to proceed through, are iterated over.

In other words, the voxels that the wave needs to proceed through may be represented/imagined as rows of voxels stacked on top of each other. The method iterates along each row, starting from the top row and working towards the bottom row, looking for fillable voxels. If a non-fillable (i.e. border or previously filled) voxel is encountered, the current wave rectangle is split into up to three wave rectangles. The first wave rectangle contains every complete, unblocked row (if any) found so far in the iteration. The second wave rectangle contains the unblocked portion of the current row (if any), and the same portion of every subsequent row in front of the original wave rectangle. The third wave rectangle contains the remaining portion of the current row, and the same portion of every subsequent row. The first and second waves rectangles (if any) are entered into the collection of waves to be processed, and the third wave continues to be processed.

In addition, if the first voxel of the first row is blocked, the first row (and potentially subsequent rows) continues to be processed until a fillable voxel is encountered. At that point, the wave rectangle is split into two. The first wave rectangle does not contain the blocked portion of the current row, but does contain the same portion of every subsequent row. The second wave rectangle contains the remaining portion of the current row, and the same portion of every subsequent row.

The first wave rectangle is entered into the collection of waves to be processed, and the second wave continues to be processed.

Each time a wave is advanced, the borders of its child wave rectangles are extended, or new child wave rectangles are created on each edge of the parent rectangle that doesn't already have a child.

In view of the above, all fillable voxels, reachable from an anchor voxel, may be filled in reasonably efficient time. As with the 2D method described above, the 3D methodology would typically examine each voxel once.

Logical Flow

Figure 7:
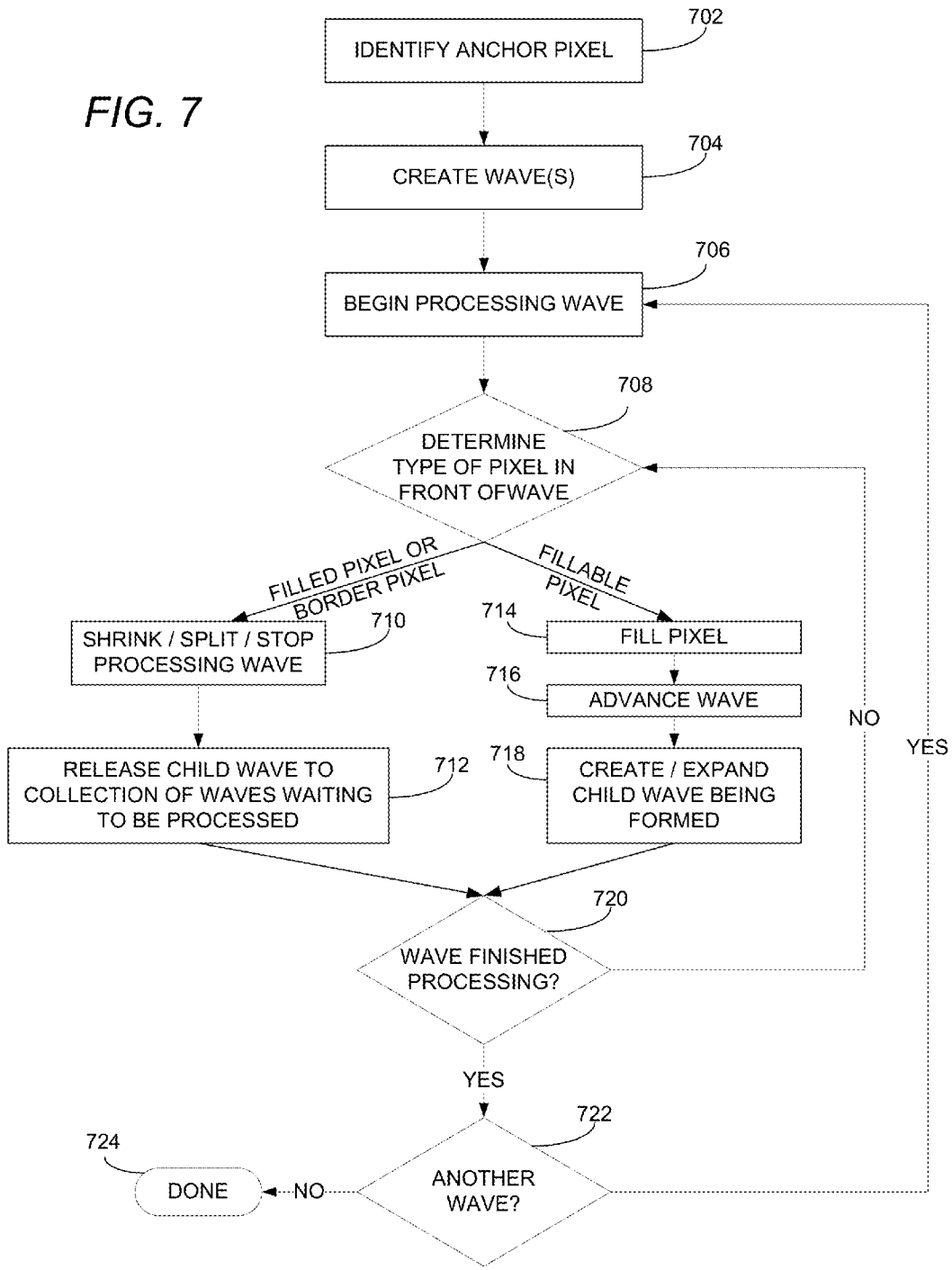
FIG. 7 illustrates the logical flow for filling image pixels in accordance with one or more embodiments of the invention.

FIG. 7 illustrates the logical flow for filling image pixels in accordance with one or more embodiments of the invention.

At step 702, an anchor pixel (of an area of an image to be filled) is identified. The anchor pixel may be located at a certain location (e.g., lower left corner of an image) or may be identified by the user. Further, the image/area of the image may be obtained by a user retrieving, identifying, or creating an image/area of an image.

At step 704, the method for filling pixels using a wave is initialized by creating four (4) waves—on the top, bottom, left, and right sides of the anchor pixel. The four waves are placed into the collection of waves 308 to be processed. The method completes when all waves 304-308 have been removed from the collection of waves 308 to be processed, and processed.

At step 706, one of the waves from the waves waiting to be processed 308 becomes the current wave 304 and processing begins.

At step 708, the row or columns of pixels in front of the wave is examined to determine if the wave can proceed through them. As described above, there are three types/kinds of pixels that may be found in front of a wave, previously filled pixels 314, border pixels 310, or fillable pixels. Thus, at step 708, a determination is made regarding what type of pixel is in front of the wave.

If the pixel in front of the wave 304 is blocking the wave, the pixel is either a previously filled pixel 314 or a border pixel 310 and processing is performed in accordance with steps 710-712. However, if the pixel is a fillable pixel, processing is performed in accordance with steps 714-718. In this regard, each of the pixels in front of the wave 304 is examined, from one end of the wave 304 to the other (i.e., from left to right or from right to left), filling fillable pixels, shrinking the wave 304 if it is blocked at the ends, splitting the wave 304 if it is blocked in the middle, or terminating the wave 304 if it is entirely blocked.

When a wave 304 encounters a filled pixel 312-314 or a border pixel 310, a determination may be made (at step 710) regarding the extent of the blockage. If the entire wave 304 is blocked, the wave 304 cannot advance further and processing continues at step 712. If the blocking pixel extends to the end of the wave 304 (i.e., to the right or left edge of the wave), the wave is shrunk as described above with respect to FIGS. 5A-5C. In other words, the end (e.g., left or right end) of the wave 304 is shrunk enough to allow the wave 304 to advance where it isn't blocked by the blocking pixels.

If the blocking pixel is in the middle of the wave 304 (i.e., with portions of the wave 304 remaining unblocked on both sides of the blocking pixel), the wave 304 is split as described above with respect to FIGS. 6A-6D.

Once the wave is finished processing, shrunk, or split, the processing continues at step 712 where one child wave or both child waves of the current wave 304 is released to the collection of waves waiting to be processed. A child wave is released if its respective end of the advancing wave is blocked. In this regard, if the wave 304 is shrunk on the left side (due to a blocking pixel on the left side of the advancing wave 304), the left child wave is no longer attached to the advancing wave 304. Accordingly, the left child wave is now ready to be processed as a new wave and is released into the collection of waves 308. Similarly, if the wave is split, the portion of the wave that is no longer attached to the advancing wave as well any child waves of the unattached/split-away wave are released to the collection of waves 308 ready to be processed. In this regard, once a wave is shrunk or split, any unattached/split-away waves and child waves are released to the collection of waves 308 waiting to be processed. Any waves that are still attached to advancing wave 304 are still being formed as child waves 306.

Once the wave 304 is shrunk/split appropriately and child waves have been released, a determination is made at step 720 regarding whether wave 304 is finished processing. If the entire wave is blocked or the edge of the image has been reached, the wave 304 is finished processing, and additional waves, if any, are processed via steps 722 and the repeat of steps 708-718. Once all waves have been processed, the method is complete at step 724.

Per step 720, if the wave 304 is still advancing, the process continues back at step 708. Once a fillable pixel has been located for the advancing wave 304, the fillable pixel is filled at step 714 and advances to the next pixel at step 716. Once the wave 304 advances, any attached child waves 306 are expanded. Alternatively, if there is a missing child wave 306 on either the left or the right side of the wave 304, a new child wave 306 may be created at step 718 (if possible). In this regard, in one or more embodiments, if the blocking pixel is still blocking the formation/advancement of a child wave, a child wave 306 is not formed. Alternatively, the wave 306 may still be formed, but when processed via steps 710-712, such a wave may not advance any further.

In view of the above, an advancing wave 304 has child waves 306 that grow/expand on the left/right sides until a blocking pixel is met at which point one or more of the child waves 306 transition to waves 308 waiting to be processed. Once all waves 304-308 have been removed from the collection of waves 308 to be processed, and processed, the method is complete at step 724.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to fill an area of an image based on the concept of an advancing wave. Organizing such a flood fill operation using waves as described herein provides an efficient manner for performing the fill. As the current wave advances, embodiments of the invention merely check pixels in front of the wave to determine if they are fillable. It is reasonably uncommon for the methodology set forth herein to check a given pixel of the image more than once.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for filling one or more pixels of an image, comprising:
   (a) obtaining an area of the image, wherein the area is comprised of the one or more pixels;
   (b) identifying one of the one or more pixels as an anchor pixel;
   (c) creating one or more waves based on the anchor pixel;
   (d) placing the one or more waves into a collection of one or more waves waiting to be processed;
   (e) processing each of the waves in the collection of one or more waves waiting to be processed by:
      (1) determining a type of pixel in front of a current wave being processed;
      (2) when the type of pixel is fillable:
         (i) filling the pixel;
         (ii) advancing the current wave; and
         (iii) updating one or more child waves of the current wave; and
      (3) when the type of pixel is blocking:
         (i) updating the current wave; and
         (ii) updating one or more child waves of the current wave; and
   (f) displaying, on a display device, the area of the image based on the fill.

2. The method of claim 1, wherein the creating one or more waves based on the anchor pixel comprises:
   creating a top wave on a top of the anchor pixel;
   creating a bottom wave on a bottom of the anchor pixel;
   creating a left wave on a left side of the anchor pixel; and
   creating a right wave on a right side of the anchor pixel.

3. The method of claim 1, wherein a type of pixel is fillable when a color distance between the pixel and the anchor pixel does not exceed a defined tolerance value.

4. The method of claim 1, wherein a pixel that is blocking comprises a border pixel, wherein a color distance between the border pixel and the anchor pixel exceeds a defined tolerance value.

5. The method of claim 1, wherein a pixel that is blocking comprises a filled pixel that has already been filled by the one or more waves.

6. The method of claim 1, wherein the updating of the one or more child waves of the current wave when the type of pixel is fillable comprises:
   creating a new child wave that is attached to the current wave.

7. The method of claim 1, wherein the updating of the one or more child waves of the current wave when the type of pixel is fillable comprises:
   expanding the one or more child waves to maintain an attachment between the one or more child waves and the current wave.

8. The method of claim 1, wherein the updating of the current wave and the updating of one or more child waves of the current wave when the type of pixel is blocking comprises:
   shrinking the current wave such that the current wave can advance without being blocked; and
   releasing one or more of the child waves, that are no longer attached to the current wave, into the collection of waves waiting to be processed.

9. The method of claim 1, wherein the updating of the current wave and the updating of one or more child waves of the current wave when the type of pixel is blocking comprises:
   splitting the current wave into a first wave and a second wave wherein:
      the first wave remains the current wave for processing and is no longer blocked; and
      the second wave is no longer blocked and is released into the collection of waves waiting to be processed; and
   releasing one or more of the child waves, that are no longer attached to the current wave, into the collection of waves waiting to be processed, wherein the released one or more child waves become child waves of the second wave upon the releasing.

10. The method of claim 1, wherein:
   the one or more pixels comprise one or more voxels; and
   the one or more waves are processed in a three-dimensional (3D) environment.

11. A non-transient computer readable storage medium encoded with computer program instructions which when accessed by a computer cause the computer to load the program instructions to a memory therein creating a special purpose data structure causing the computer to operate as a specially programmed computer, executing a method of filling one or more pixels of an image, comprising:
   (a) obtaining, in the specially programmed computer, an area of the image, wherein the area is comprised of the one or more pixels;
   (b) identifying, in the specially programmed computer, one of the one or more pixels as an anchor pixel;
   (c) creating, in the specially programmed computer, one or more waves based on the anchor pixel;
   (d) placing, in the specially programmed computer, the one or more waves into a collection of one or more waves waiting to be processed;
   (e) processing, in the specially programmed computer, each of the waves in the collection of one or more waves waiting to be processed by:
      (1) determining a type of pixel in front of a current wave being processed;
      (2) when the type of pixel is fillable:
         (i) filling the pixel;
         (ii) advancing the current wave; and
         (iii) updating one or more child waves of the current wave; and
      (3) when the type of pixel is blocking:
         (i) updating the current wave; and
         (ii) updating one or more child waves of the current wave; and
   (f) displaying, on a display device, via the specially programmed computer, the area of the image based on the fill.

12. The computer readable storage medium of claim 11, wherein the creating one or more waves based on the anchor pixel comprises:
   creating a top wave on a top of the anchor pixel;
   creating a bottom wave on a bottom of the anchor pixel;
   creating a left wave on a left side of the anchor pixel; and
   creating a right wave on a right side of the anchor pixel.

13. The computer readable storage medium of claim 11, wherein a type of pixel is fillable when a color distance between the pixel and the anchor pixel does not exceed a defined tolerance value.

14. The computer readable storage medium of claim 11, wherein a pixel that is blocking comprises a border pixel, wherein a color distance between the border pixel and the anchor pixel exceeds a defined tolerance value.

15. The computer readable storage medium of claim 11, wherein a pixel that is blocking comprises a filled pixel that has already been filled by the one or more waves.

16. The computer readable storage medium of claim 11, wherein the updating of the one or more child waves of the current wave when the type of pixel is fillable comprises:
creating a new child wave that is attached to the current wave.

17. The computer readable storage medium of claim 11, wherein the updating of the one or more child waves of the current wave when the type of pixel is fillable comprises:
expanding the one or more child waves to maintain an attachment between the one or more child waves and the current wave.

18. The computer readable storage medium of claim 11, wherein the updating of the current wave and the updating of one or more child waves of the current wave when the type of pixel is blocking comprises:
shrinking the current wave such that the current wave can advance without being blocked; and
releasing one or more of the child waves, that are no longer attached to the current wave, into the collection of waves waiting to be processed.

19. The computer readable storage medium of claim 11, wherein the updating of the current wave and the updating of one or more child waves of the current wave when the type of pixel is blocking comprises:
splitting the current wave into a first wave and a second wave wherein:
the first wave remains the current wave for processing and is no longer blocked; and
the second wave is no longer blocked and is released into the collection of waves waiting to be processed; and
releasing one or more of the child waves, that are no longer attached to the current wave, into the collection of waves waiting to be processed, wherein the released one or more child waves become child waves of the second wave upon the releasing.

20. The computer readable storage medium of claim 11, wherein:
the one or more pixels comprise one or more voxels; and
the one or more waves are processed in a three-dimensional (3D) environment.

\* \* \* \* \*